United States Patent Office.

SILAS H. BOWMAN, OF HALF MOON BAY, CALIFORNIA.

Letters Patent No. 77,163, dated April 28, 1868.

IMPROVEMENT IN THE MANUFACTURE OF BRICK.

The Schedule referred to in these Letters Patent and making part of the same.

TO ALL WHOM IT MAY CONCERN:

Be it known that I, SILAS H. BOWMAN, of Half Moon Bay, county of San Mateo, State of California, have invented certain new and useful Improvements in the Manufacture of Brick; and I do hereby declare that the materials used, and the manner of mixing and preparing the same to manufacture the said brick with the best apparatus known to me for the purpose, are described in the following specification.

The nature of my invention is to so combine and mix combustible materials with the clay employed in making brick, that the time ordinarily occupied in burning, and the cost of fuel, will be greatly reduced, while the substances incorporated are consumed.

In order to more fully explain the mode of manufacture, I will base my calculation on material sufficient for making one thousand bricks.

In the first place, I saturate the clay with water, before it is ground in the usual way, and add to it from three to ten gallons of crude petroleum, and from two hundred to four hundred pounds of peat.

The quantity of oil or crude petroleum and peat to be added should, in all cases, be governed by the quality of clay used. Where it is entirely argillaceous, or pure alumina, a greater quantity of oil and peat may be used; where it is principally a clayey loam, similar to the earth employed in California, where my experiments have been performed, a less quantity of petroleum and peat is necessary, and I find that four, and even three, gallons will answer very well, and two hundred pounds of peat, for the manufacture of one thousand bricks.

The tempering of the mass is effected in the usual way, by means of a clay or pug-mill, or even by more modern devices, if such good machinery can be had; and the ingredients so mixed are made into bricks of the usual size and shape, after which they are exposed for drying in the sun.

In the process of drying, great care should be had that the water be as nearly evaporated as possible, so that too much steam may not be generated in the burning; yet I am not sure but that it might be an auxiliary, provided the flames or heat of the kiln be raised to a temperature sufficient to cause the steam to become superheated; yet I am not fully prepared to say that such would be the case, as my experiments do not extend so far in the matter as to decide positively that superheated steam could be formed without vitrifying the brick; and therefore, so far as my experience has extended, I should prefer to have the bricks very well dried before placing them in the kiln. This may also be performed in the usual way, when they may be set in the ordinary manner.

As the burning of bricks is a matter of considerable difficulty, and requires an experienced workman, it may be said to be none the less so in the use of my improvements, as it is necessary to maintain an equal heat throughout the whole mass, and the fire should be kindled simultaneously in all parts of the kiln, and be driven as rapidly as possible through it, so that the steam and vapors will not be driven to portions of it where there is no flame or heat.

The fuel to be employed may be wood or coal, and a much less quantity is needed, the amount necessary, in most instances, being reduced nearly one-half, and the time consumed in burning is lessened to a great extent, while the bricks are uninjured by porosity, although they may be a little lighter in weight; neither are they uncommonly affected by warping; and, I might add, that hardly so great a percentage is affected as where the ordinary method of making bricks is pursued.

Either one of the above-described substances may be used separately, and answer a very good purpose, but I prefer to use them in combination.

I claim the use of petroleum and peat in the manufacture of bricks, by mixing both, or either one of them, with the clay of which bricks are to be made, substantially in the manner and for the purposes herein set forth.

In witness whereof, I have hereunto set my hand and seal.

SILAS H. BOWMAN. [L. S.]

Witnesses:
   C. W. M. SMITH,
   J. L. BOONE.